Figure 1:
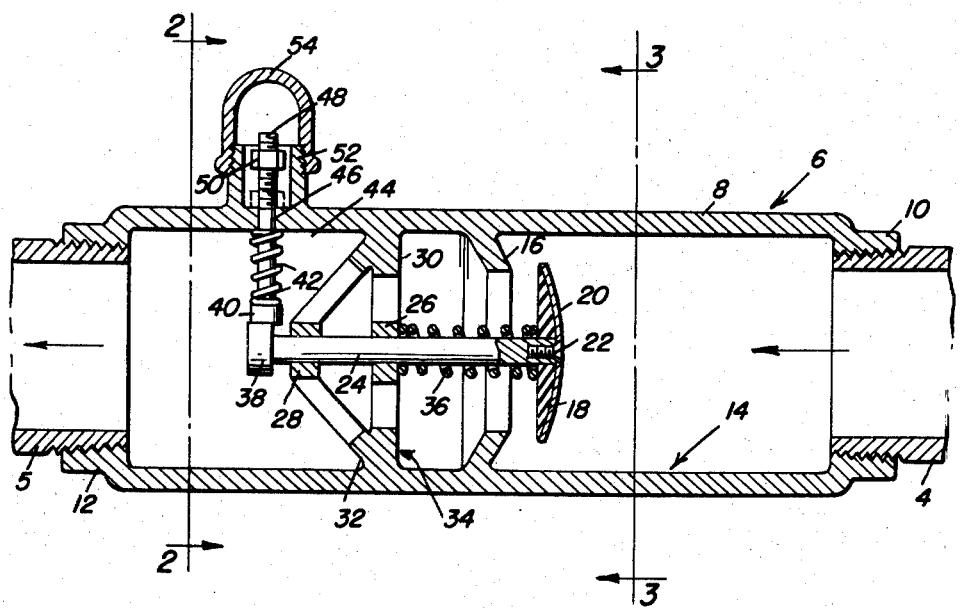

March 1, 1960   J. D. MARTIN   2,926,690
PRESSURE RESPONSIVE FLOW-STOP VALVE
Filed Nov. 4, 1957

James D. Martin
INVENTOR.

United States Patent Office 2,926,690
Patented Mar. 1, 1960

2,926,690

PRESSURE RESPONSIVE FLOW-STOP VALVE

James D. Martin, Van Nuys, Calif.

Application November 4, 1957, Serial No. 694,180

1 Claim. (Cl. 137—460)

The present invention relates to certain new and useful improvements in a novel spring-biased normally open shut-off or flow-stop valve which is expressly designed and consequently adapted to prevent excessive flow of gas or liquid in a line in which the valve is installed, that is, where a break in the line, or a flow control regulator interferes with the intended flow in said line.

Stated otherwise, the concept has to do with a simple, practical and efficient automatic pressure responsive spring opened valve which comes into play when acted on by abnormal pressure or velocity, whereupon the valve then closes and is automatically latched in a closed position and stays closed until the latch or retainer is manually adjusted to permit the valve to return to its normal or set position.

The invention also features a highly practical and sensitive valve construction which employs a re-set spring projected latch which is accessibly arranged so that by simply turning a nut with which it is provided the closed cut-off or safety valve may be released and spring pressed to its normally open position.

It is a matter of common knowledge to those familiar with the state of the art to which the invention relates that many and various styles and forms of abnormal pressure actuated safety valves have been devised for use particularly in connection with gas mains and lines involving danger in one manner or another. An object of the instant invention is to structurally, functionally and otherwise improve upon the prior art adaptations and, in having done so, to provide an improved construction which fulfills the purposes for which it is intended and does so in a highly satisfactory and effectual manner.

Other objects, features and advantages will become more readily apparent from the following description and the accompanying drawings.

In the drawing, wherein like numerals are employed to designate like parts throughout the same:

Fig. 1 is a view primarily with the parts in section but portions in elevation taken centrally through a flow-stop valve constructed in accordance with the invention and showing how it is installed and is set in open position.

Figure 2:
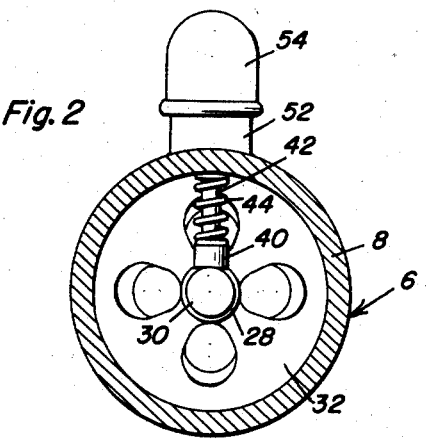
Figure 3:
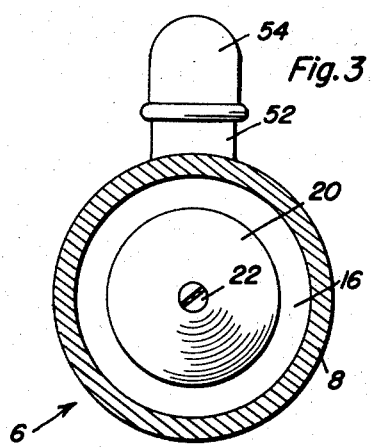

Figs. 2 and 3 are cross-sections on the lines 2—2 and 3—3 respectively of Fig. 1.

Referring now to the drawing the pipe sections of the main or equivalent line are denoted by the numeral 4 at the right and 5 at the left and the improved valve 6 is installed therebetween and comprises a cylindrical body or casing 8 having screw-threaded necks 10 and 12 connected in the manner shown. Within the passageway or chamber 14 there is a suitable valve seat 16 for the rubber faced side 18 of the mushroom valve 20. The valve is held in place by a screw 22 connected with the valve stem 24. The valve stem is operable through the axially aligned guides 26 and 28 embodied in the components 30 and 32 of the spider means 34. It will be noticed that the valve is held off its seat by a coil spring 36 having one end bearing against the hub or guide 26. The portion of the stem or rod 24 projecting beyond the guide 28 is provided with an enlarged head 38 forming a stop shoulder.

A second head 40 is provided on the latch rod 42 of an automatically operable spring biased safety latch. A coil spring 44 bears at one end against the head 40 and at the other end against the wall of the casing at which point the wall is provided with an opening 46 in alignment with the first named head 38 and permitting passage of the screw-threaded end portion 48 of the stem. There is a re-set nut 50 on the threaded end which operates in the socket-like extension 52 on the casing which extension is provided with a detachable screw cap or an equivalent closure 54. The nut 50 is mounted on an accessible end of the screw threaded portion 48 of the rod 42 said nut being operatively adjustable to abut the exterior surface of said coupling and being rotatable on the screw threads to lift and withdraw the head 40 on the latch rod from the space between the first named head 38 and the stem guide 28, said nut being also movable away from said exterior surface thereby enabling the second named spring to move the second named head into the stated space.

It will be noted that gas or liquid will flow into the valve casing 6 as indicated by the arrows from the inlet to the outlet. The gases flow around the valve disk and through the seat and then on through the outlet. The valve stem spring 36 is set at the same tension as the maximum regulator delivery pressure upstream of the valve. The valve stem is supported as already mentioned by the spiders or guides 26 and 28. The headed end 38 of the valve stem provides the locking or check shoulder and when the valve is closed the cooperating head 40 on the spring pressed latch stem projects behind the shoulder and keeps the valve closed. The re-set nut 50 may be backed off manually to allow the rod 42 to drop if the safety valve 20 closes. By running the re-set nut down the latch rod can be brought up and valve disk 20 opened. The cover or closure 54 serves to afford the desired protection and to seal the opening in the valve.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A pressure responsive abnormal gas flow cut-off valve comprising a coupling provided interiorly with a fixed valve seat, integral spider means spaced from said valve seat including longitudinally spaced axially aligned valve stem guides, a valve stem having a median portion slidable in said guides, one end of said stem having a valve element adjacent to and operatively movable toward and from said seat, a first coil spring surrounding a portion of the stem and bearing at one end against the valve element and at the other end against that stem guide closest to said valve element, the end of the stem remote from said valve element having a first head spaced from an adjacent cooperating guide and constituting a retaining shoulder, said coupling having a guide opening in alignment with said shoulder, a latch rod disposed at right angles to said valve stem and having an outer screw threaded end portion passing outwardly through and beyond an exterior surface of said coupling, the inner end portion of said rod projecting into the passage of the coupling and having a head on its inner end normally resting upon a portion of the periphery of said first head and operative, when released, to assume a latching position between the first head and the adjacent stem guide, a second coil spring encircling the portion of said rod between the adjacent wall portion of the coupling and the head on said rod, a re-set nut mounted on the accessible screw threaded portion of said rod, said nut being operatively adjustable to abut against the exterior surface of said coupling and further rotatable to lift and withdraw the head on said rod from the space between the first head and said stem guide, said nut being movable away from said exterior surface thereby enabling said second spring to move said second head into said space, and means accessibly mounted on said coupling and enclosing the nut-equipped threaded end of said rod, said means embodying a radial socket-like extension housing said threaded end, said extension being provided with a closing cap.

References Cited in the file of this patent

UNITED STATES PATENTS

| | | |
|---|---|---|
| 1,001,324 | Thompson | Aug. 22, 1911 |
| 2,253,580 | Rahe | Aug. 26, 1941 |
| 2,718,236 | Nowee | Sept. 20, 1955 |